United States Patent [19]

Wang

[11] Patent Number: 4,830,388
[45] Date of Patent: May 16, 1989

[54] RIDABLE MULTI-FUNCTIONAL WHEELCHAIR ASSEMBLY

[75] Inventor: Allen S. P. Wang, 2nd Fl. No. 22, Alley 401, Lane 150, Hsing Yi Road Sec. 5, Taipei, Taiwan

[73] Assignee: Allen S. P. Wang, Taipei, Taiwan

[21] Appl. No.: 113,133

[22] Filed: Oct. 27, 1987

[51] Int. Cl.⁴ .............................................. B62K 3/16
[52] U.S. Cl. .................................... 280/202; 272/73; 280/304.1
[58] Field of Search ....... 280/202, 242 WC, 289 WC, 280/295, 293; 272/73; 297/DIG. 4

[56] References Cited

U.S. PATENT DOCUMENTS

| | | | |
|---|---|---|---|
| 557,841 | 4/1896 | Locke | 280/202 |
| 607,355 | 7/1898 | Eickemeyer | 280/202 |
| 625,377 | 5/1899 | Blood et al. | 280/202 |
| 1,059,466 | 4/1913 | Hosmer | 280/202 |
| 3,423,086 | 1/1969 | Moore | 272/73 |
| 4,770,431 | 9/1988 | Kulik | 280/202 |

Primary Examiner—Charles A. Marmor
Assistant Examiner—Mitchell J. Hill
Attorney, Agent, or Firm—Browdy and Neimark

[57] ABSTRACT

A ridable multi-functional wheelchair assembly, aside from being used as a general wheelchair, may be converted into a pedicab by connecting a rear wheel thereto; the pedicab may be further converted into a tread wheel by suspending the rear wheel from the ground or floor with an U-shaped supporter.

7 Claims, 6 Drawing Sheets

RIDABLE MULTI-FUNCTIONAL WHEELCHAIR ASSEMBLY

BACKGROUND OF THE INVENTION

The present invention relates generally to a ridable multi-functional wheelchair to the rear bottom of which a rear wheel may be connected to form a pedicab so that, one originally pushing the wheelchair around, may now ride on this pedicab and pedal it around, thereby a lot of energy and time may be saved, and a longer travel distances may be covered.

The primary object of the present invention is to provide a wheel chair assembly which can be converted to a pedicab by attaching an extra ridably driving wheel to the rear of the wheelchair.

One further object of the present invention is to provide a wheelchair with a detachable seat which may be removed and replaced by a basket or a baby chair to make its application diversified.

Still another object of the present invention is to provide a wheelchair which may be converted into a pedicab first, then further into a tread wheel for exercise purpose by holding the rear wheel away from the ground or floor with an U-shaped head supporter and adopting a finely adjustable resistance device to an original brake system on the rear wheel.

BRIEF DESCRIPTION OF THE DRAWINGS

To make the structure and operation mode of the present invention more obvious and comprehensive, a specific embodiment of the invention will now be described with reference to the accompanying drawings of which.

DETAILED DESCRIPTION

Figure 1:
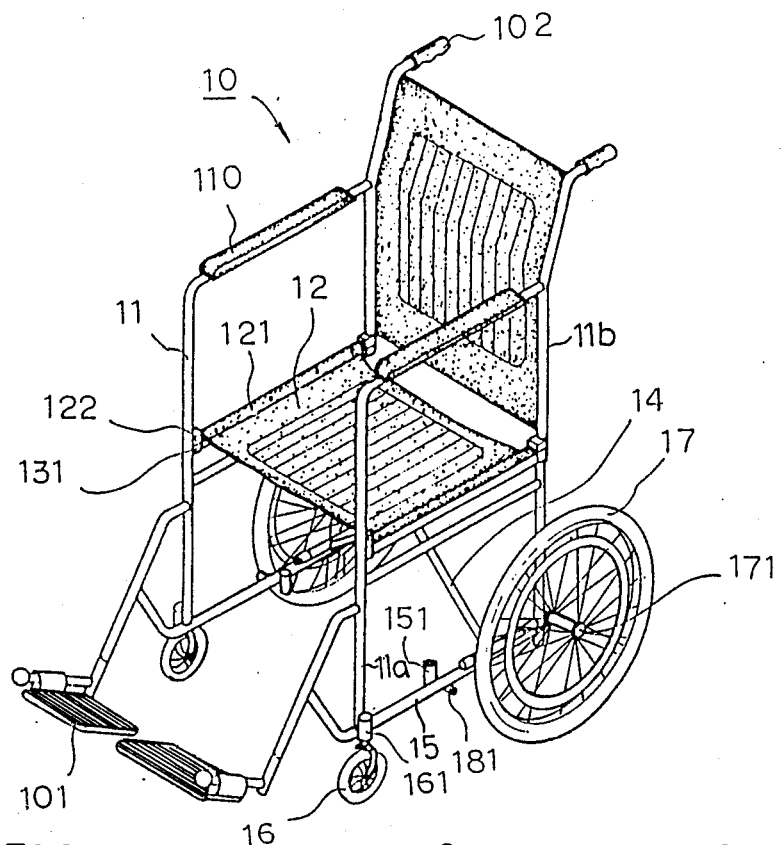
FIG. 1 is a three-dimensional perspective of the invention in the form of a general wheelchair.

Referring now to FIG. 1 through FIG. 4 the invention is basically a wheelchair 10 which has a pair of bilaterally symmetrical frameworks 11 each of which generally includes a front vertical bar 11a, a rear vertical bar 11b, a horizontal chair arm 110, and a side bottom bar 15. Near the bottom of each front vertical bar 11a, an extension is formed outwardly and downwardly so to detachably connect a pedal 101 thereto at the upper end of each rear vertical bar 11b, a generally horizontally extended handle 102 is formed. Near the inner middle of each side bottom bar 15, a sleeve 151 is vertically fixed to receive a joint pin 241 disposed at both ends of an inter-wheel rod 24. A bolt may be screwed through a threaded hole 152 disposed on the side of the sleeve 151 into a hole on the joint pin 241 formed at a position relative to the hole 152, so that the inter-wheel rod 24 may be mounted or removed at any time (see FIG. 7).

Near the bottom middle of each side bottom bar 15, a front wheel axle 181 projects outwardly therefrom so to receive a front wheel 18. Meanwhile, at the front end and the rear end of each said side bottom bar 15, a wheel seat 161 and a hand-push wheel axle 171 are formed respectively to receive a direction-control wheel 16 and a hand-push wheel 17 respectively.

Figure 5:
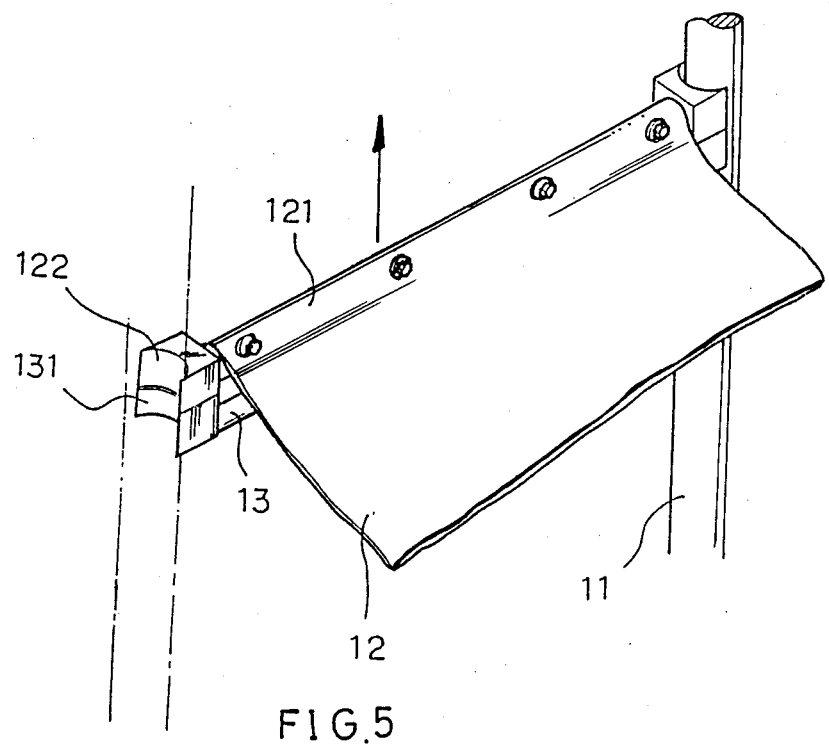
FIG. 5 is a fragmentary perspective of the invention showing the structure of the slidable seat bar.
Figure 7:
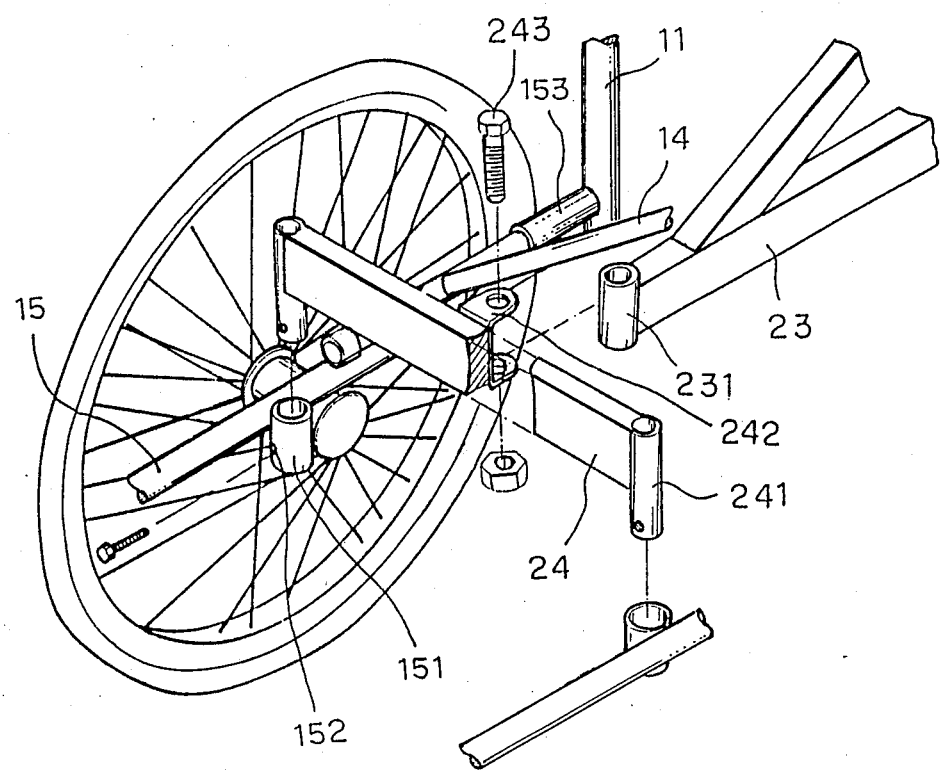
FIG. 7 is a three-dimensional, fragmentary, analytical perspective of the invention showing the connection of pedicab framework to the wheelchair framework.
Figure 6A:
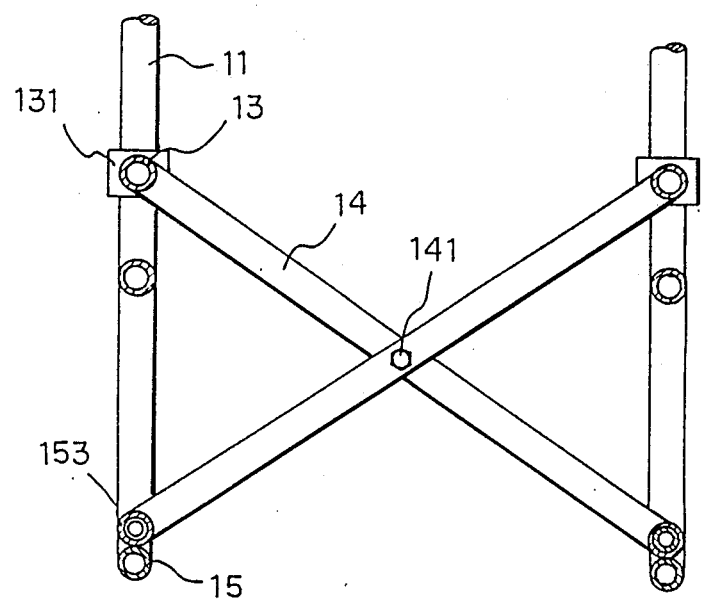
FIGS. 6A and 6B are fragmentary, side elevational views of the invention showing the folding movement of the wheelchair framework.
Figure 6B:
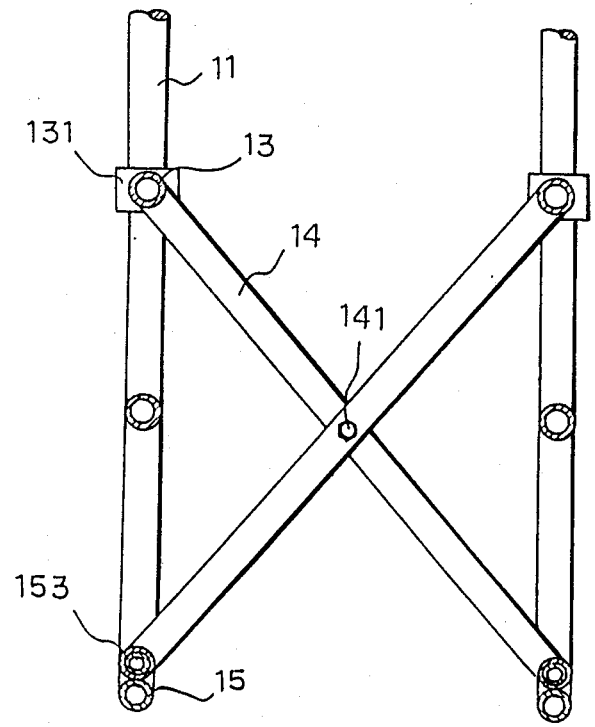

Each said side bottom bar 15 has a set of sleeves 153 fixed apart on the rear upper side to pivotally receive a cross bar formed at the lower end of a pair of crossed rods 14 which are pivotally associated at the crossing by a pivot axle 141 (see FIGS. 6 and 7). Each upper end of the crossed rods 14 has a horizontally sliding bar 13 extending and slidable upward and downward between the front and the rear vertical bars 11a and 11b with the help of two U-shaped sliding blocks 131 separately fixed to each end of the sliding bar 13 and closely attaching to and slidable on the vertical bars 11a and 11b (see FIGS. 5 and 6).

Just above each sliding bar 13, there is a chair seat supporter 121 which is structured in the same form as that of sliding bar 13. The two U-shaped sliding blocks 122 at the two ends of each seat supporter 121 may also cause the supporter 121 to be slidable between the vertical bars 11a and 11b to facilitate the folding of the wheelchair whenever necessary.

Figure 3:
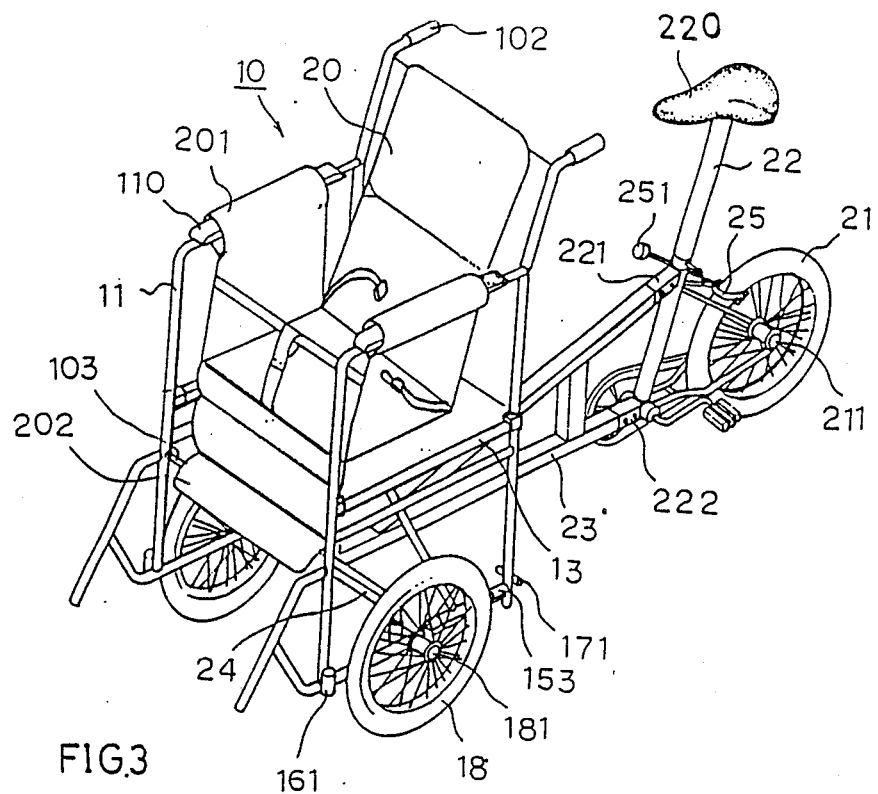
FIG. 3 is a three-dimensional perspective of the invention in the form of a pedicab with a baby chair instead of original seat.

As shown in FIG. 3, the foresaid wheelchair 10 may be converted into a baby carriage by substituting a baby chair seat 20 for the original chair seat 12. The baby chair seat includes a pair of sidepieces 201 each one of which may surround a chair arm 110 and then tightly fasten the free end to itself, becoming securely hung on chair arm 110, and a foot plate 202 extending from the front bottom of the seat 20 with a cross supporter 103 disposed thereunder and extending between the two front vertical bars 11a so that it would not move with a baby's feet being placed thereon.

Figure 4:
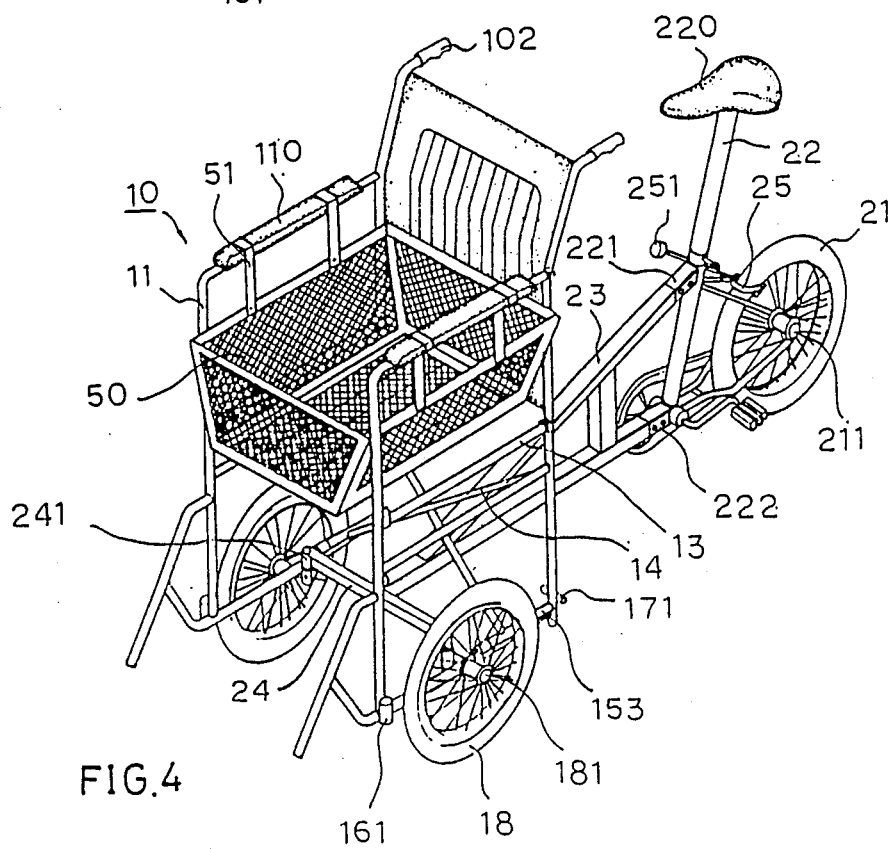
FIG. 4 is a three-dimensional perspective of the invention in the form of a pedicab with a basket in the front thereof.

As shown in FIG. 4, the foresaid wheelchair 10 may also be converted into a general carriage by substituting a basket 50 for the original chair seat 12. The basket 50 has four or more hangers 51 for fixing itself to the chair arms 110 for receiving miscellaneous articles therein.

Figure 2:
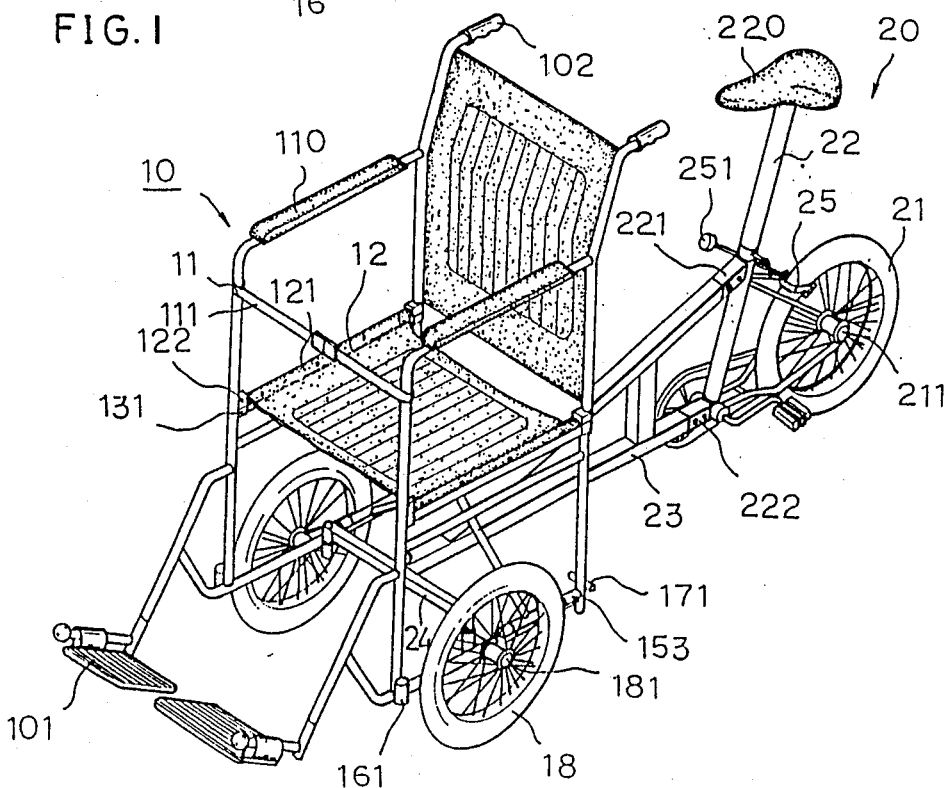
FIG. 2 is a three-dimensional perspective of the invention in the form of a pedicab.
Figure 8:
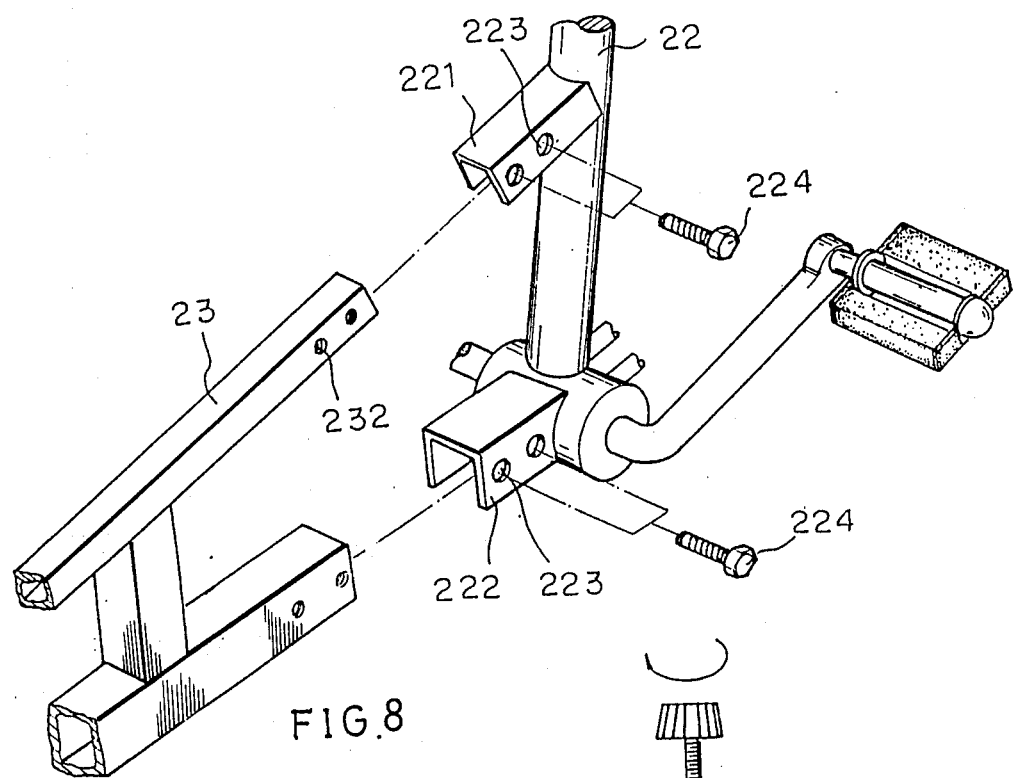
FIG. 8 is a three-dimensional, fragmentary, analytical perspective of the invention showing the connection of the pedicab framework to the pedicab seat supporter.

As shown in FIG. 2, said wheelchair 10 may be converted into a pedicab including, aside from the main wheelchair framework 11, a triangulate bike frame 23 (see FIGS. 7 and 8), and a saddle pillar 22 (see FIGS. 2 and 8).

At the front tip of the bike frame 23, a hollow sleeve-like head 231 is vertically defined for receiving therein a backward opened U-shaped adapter 242, welded at the rear middle of the inter-wheel rod 24. Both two horizontally extending planes of the adapter 242 are provided with an opening so that a bolt 243 may engage thereinto as well as the hollow sleeve-like head of the bike frame and pivotally secure the bike frame 23 to the inter wheel rod 24 by means a nut.

At the other two ends of the bike frame 23, there are several threaded holes 232 formed to connect an upper joint 221 and a lower joint 222 separately formed at lower section of the saddle pillar 22. Bolts 224 may be screwed therethrough to securely connect the bike frame 23 to the saddle pillar 22.

A saddle 220 is mounted on the top of the saddle pillar 22 with a rear wheel 21 connected to the back thereof, constitute a complete pedicab.

Figure 9A:
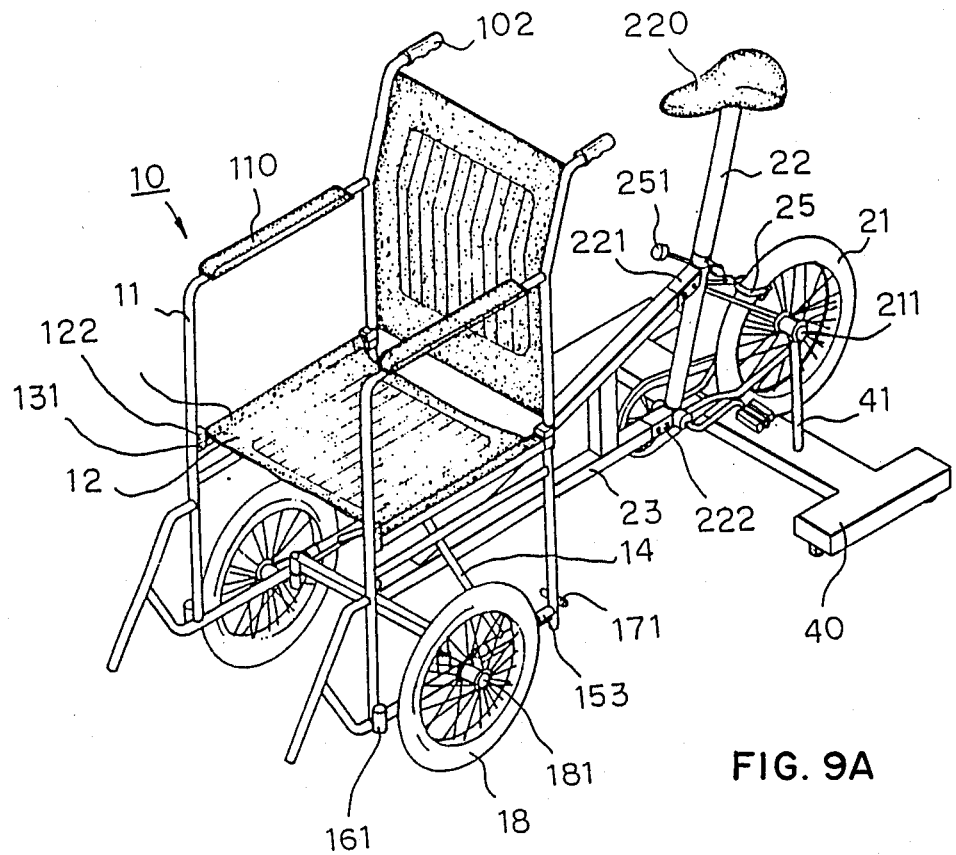
FIG. 9A is a three-dimensional perspective of the invention in the form of a tread wheel.
Figure 9B:
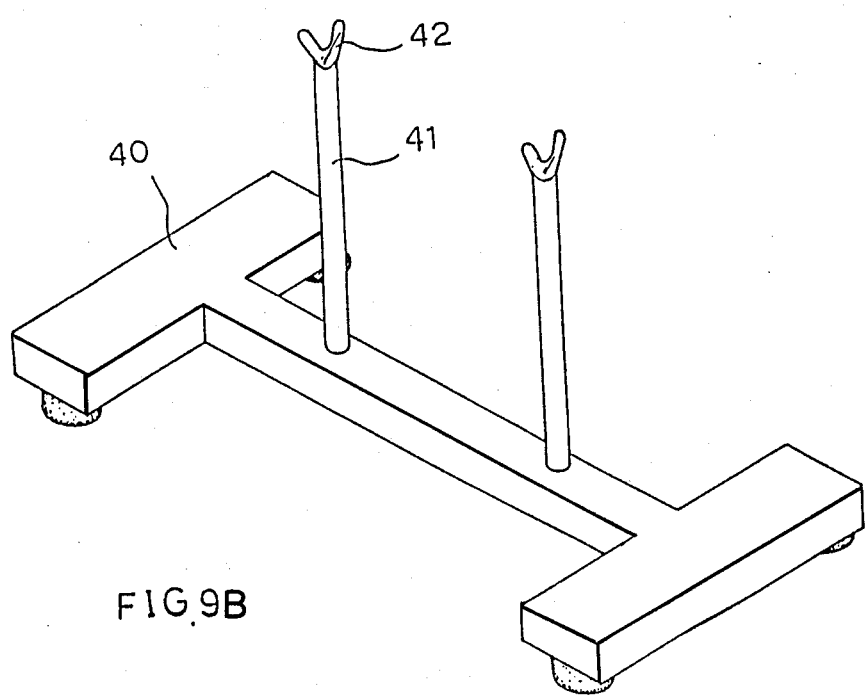
FIG. 9B is an exploded view of the support for the stationary bicycle portion.

As shown in FIG. 9, the foregoing wheelchair 10 may also be converted into a tread wheel for use as stationary pedalling exercise equipment by suspending the rear wheel 21 from the ground or floor with a horizontally placed H-shaped supporter 40. Two support arms 41 having upwardly opened U-shaped head 42 are perpendicularly disposed on the cross beam of the supporter 40 at a proper position and interval so that the U-shaped heads will just support the two rear wheel axles at their outer ends.

Figure 10:
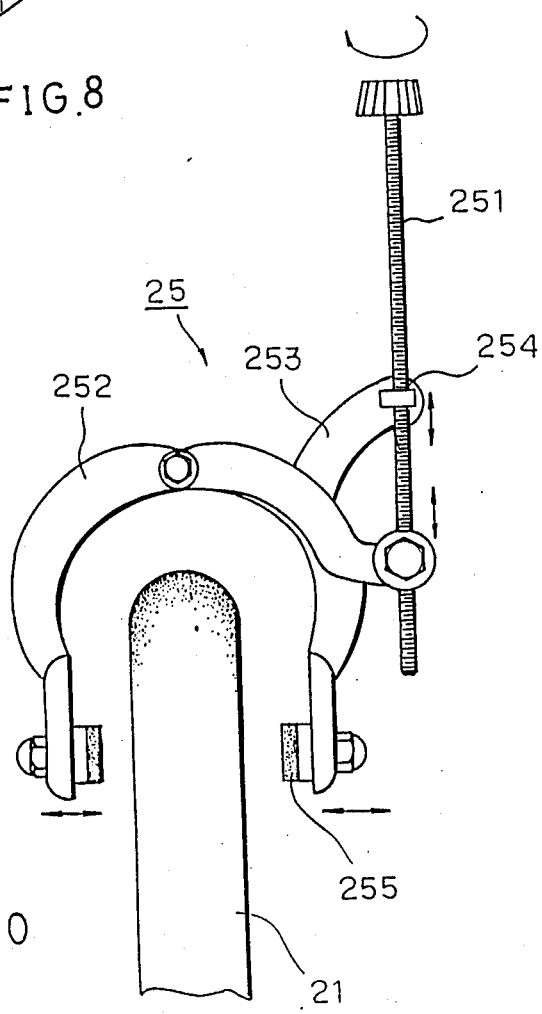
FIG. 10 is a fragmentary elevational view showing the braking resistance device for the tread wheel converted from the invention.

For the purpose of enhancing the effects of the pedicab used as exercise equipment, a finely adjustable resistance device 25 (see FIGS. 9 and 10) is set at a proper position near the rear wheel for the provision of friction against the rear wheel. As shown in FIG. 10, the resistance device 25 consists of a left jaw 252 and a right jaw 253 which are pivotally fixed together by a bolt located at the center. The ends of both the left jaw 252 and the right jaw 253, being set at the left side and the right side of the rear wheel 21 respectively, are provided with a friction member 255. The other end of the left jaw 252 is fixed to a threaded rod 251 near its lower end in such a manner that the left jaw 252 will only swing leftward or rightward while the threaded rod 251 is turned to move downward or upward respectively. Similarly, the other end of the right jaw 253 is pivotally screwed onto the middle section of the threaded rod 251 in such a manner that the right jaw 253 will swing leftward or rightward while the threaded rod 251 is turned to move downward or upward respectively. The interval between the two friction members 255 can be adjusted accordingly, therefore generating different magnitude of frictional resistance against the rear wheel 21.

A very important feature of this invention is that all the foregoing members, such as the hand-push wheels 17, direction-control wheels 16, seat 12, baby chair 20, basket 50, foot plates 101, inter-wheel rod 24, bike frame 23, saddle pillar 22, front wheels 18 and rear wheels 21, are optional and detachable.

When used as a general wheelchair, the present invention is simply treated by connecting the direction-control wheels 16, hand-push wheels 17 and overlaying the seat 12 on the sliding bars 13.

When using the present invention as a pedicab, it is assembled by removing the direction-control wheels 16, hand-push wheels 17, and assembling the front wheels 18, inter-wheel rod 24, bike frame 23, saddle pillar 22 and the rear wheel 21 together. The brake system for this pedicab is generally similar to the conventional bike foot brake, i.e., a roller shaft cam mechanism inside the shaft of the pedal cranks is uni-directionally operated and will brake the pedicab whenever the pedals are reversely rotated. Moreover, a safety belt 111, may be secured to the front vertical bars 11a to protect the rider. (see FIG. 2).

When the present invention is not in use, it can be packed by simply removing all the detachable members and pull together the bilaterally symmetrical frameworks 11. At this point, the crossed rods 14 will vertically extend with the U-shaped sliding blocks 131 at the two ends of the sliding bars 13 sliding upwardly, thus folding the wheelchair frameworks 11 tightly together, occupying relatively a small space.

What is claimed is:

1. A ridable multi-functional wheelchair assembly, comprising:
   a wheelchair having two bilaterally symmetrical frameworks, each comprising of a front vertical bar, a rear vertical bar, a chair arm, and a side bottom bar;
   each of said frameworks further comprising:
      a sleeve perpendicularly fixed at an inner substantially middle portion of said side bottom bar;
      a front wheel axle projecting outwardly near a bottom middle portion of said side bottom bar for removably receiving and connecting a front wheel;
      a wheel seat means welded to a lower end of said front vertical bar for removably connecting a direction-control wheel; and
      a hand-push wheel axle welded to a lower end of said rear vertical bar for removably connecting a hand-push wheel;
   an inter-wheel rod having joint pins formed at each end for removably connecting said rod to said sleeves of said frameworks, each of said sleeves securely receiving one of said joint pins by screwing a bolt through a threaded hole formed at a side of each of said sleeves and a hole correspondingly formed on the joint pin, said rod comprising a backward opened U-shaped adapter welded at a rear, substantially middle portion thereof, said U-shaped adapter having an opening on each horizontally extending plane thereof;
   a bicycle frame for removable attachment to said inter-wheel rod, said frame having a hollow sleeve-like head vertically formed at a front end to be fitted into said backward opened U-shaped adapter and to be pivotally secured thereto by a bolt inserted through said openings formed on the horizontal planes of said adapter and a nut screwed onto said bolt for removably attaching said frame to said wheelchair, said frame further having attachment means; and
   a saddle pillar having a saddle connected to a top end thereof, a rear wheel connected via a rear wheel axle at a rear portion thereof, and an upper joint and a lower joint separately formed at a lower portion thereof, said upper joint and said lower joint having side threaded holes disposed at a position corresponding to said attachment means of said bicycle frame for connecting said saddle pillar to said frame.

2. The assembly according to claim 1, wherein said bicycle frame has a triangular shape, said attachment means comprising several threaded holes formed at each of two rear ends of said triangular frame, wherein bolts are screwed through said threaded holes on said frame and said side threaded holes on said pillar for securely connecting the upper joint and the lower joint of said saddle pillar to said frame.

3. The assembly according to claim 1, wherein each of said frameworks further comprise a detachable foot plate connected to a lower extension thereof, and a push handle formed at a top end of said rear vertical bar.

4. The assembly according to claim 1, further comprising:
- a set of sleeves spaced from one another onto a rear portion of said side bottom bar for pivotally receiving a horizontally sliding bar connected at a lower end of a pair of crossed rods, the crossed rods being pivotally associated at their crossing by a pivotal axle;
- a sliding bar connected at an upper end of the crossed rods and horizontally extending between said front and said rear vertical bars, said sliding bar having a U-shaped sliding block at each end to engage with said vertical bars and causing said sliding bar to be movable upwardly and downwardly along said vertical bars; and
- a chair seat supporter connected at an upper end of the crossed rods and horizontally extending between said front and said rear vertical bars, said supporter having a U-shaped sliding block at each end to engage with said vertical bars and causing said sliding bar to be movable upwardly and downwardly along said vertical bars, said supporter being overlaid on said sliding bar, said sliding bar and said supporter being connected for facilitating folding of said wheelchair.

5. The assembly according to claim 1, further comprising a baby chair seat provided to be removably attached to said wheelchair frameworks, said seat having a pair of side pieces for surrounding said chair arms which are adapted to be securely hung on said chair arms and a foot plate extending from a front bottom portion of said baby chair seat with a cross supporter disposed thereunder extending between said two front vertical bars of said wheelchair frameworks.

6. The assembly according to claim 1, further comprising a hangable basket provided to be removably attached to said wheelchair frameworks, said basket having several extending hangers for hanging said basket onto said chair arms.

7. The assembly according to claim 1, further comprising:
- an H-shaped supporter for supporting the rear wheel at a distance spaced from the floor having two perpendicular support arms which have upwardly opened U-shaped heads and are set on a cross beam of said H-shaped supporter at an adequate position and interval such that said U-shaped heads will support the rear wheel axle at two outer ends and hold the rear wheel spaced from the floor; and
- a finely adjustable resistance device consisting of a left jaw, a right jaw, and a threaded rod, said left jaw and said right jaw being pivotally associated at a center position by a bolt, a right end of said left jaw being fixed to a lower end of said threaded rod and an upper end of said right jaw being pivotally screwed onto a middle portion of said threaded rod, both a left end of said left jaw and a lower end of said right jaw having a friction member attached thereto, wherein the interval between the two friction members, and thereby the frictional resistance of the friction members against said rear wheel, is adjusted by turning said threaded rod which in turn drives said left jaw and said right jaw to swing leftwardly or rightwardly responsive to the turning direction of said threaded rod.

* * * * *